March 24, 1936.                C. WILHJELM                2,034,852
                            TEMPERATURE INDICATOR
                          Filed July 27, 1932        2 Sheets-Sheet 1
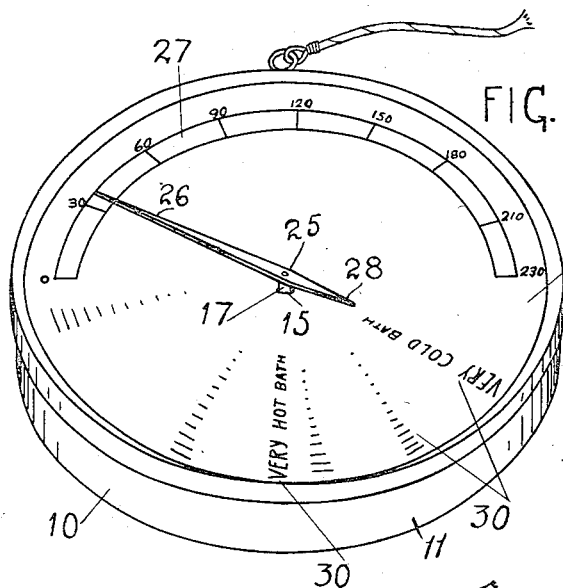
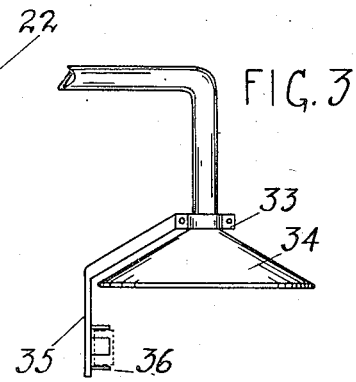
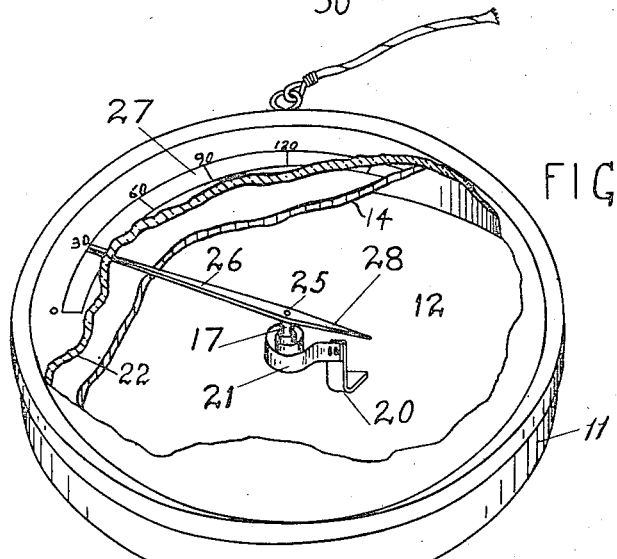
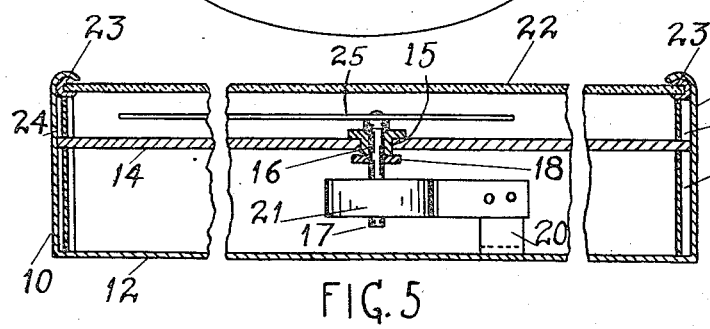
INVENTOR.
Christian Wilhjelm
BY Frank H. Borden
ATTORNEY.

March 24, 1936.                  C. WILHJELM                    2,034,852
                              TEMPERATURE INDICATOR
                          Filed July 27, 1932        2 Sheets-Sheet 2
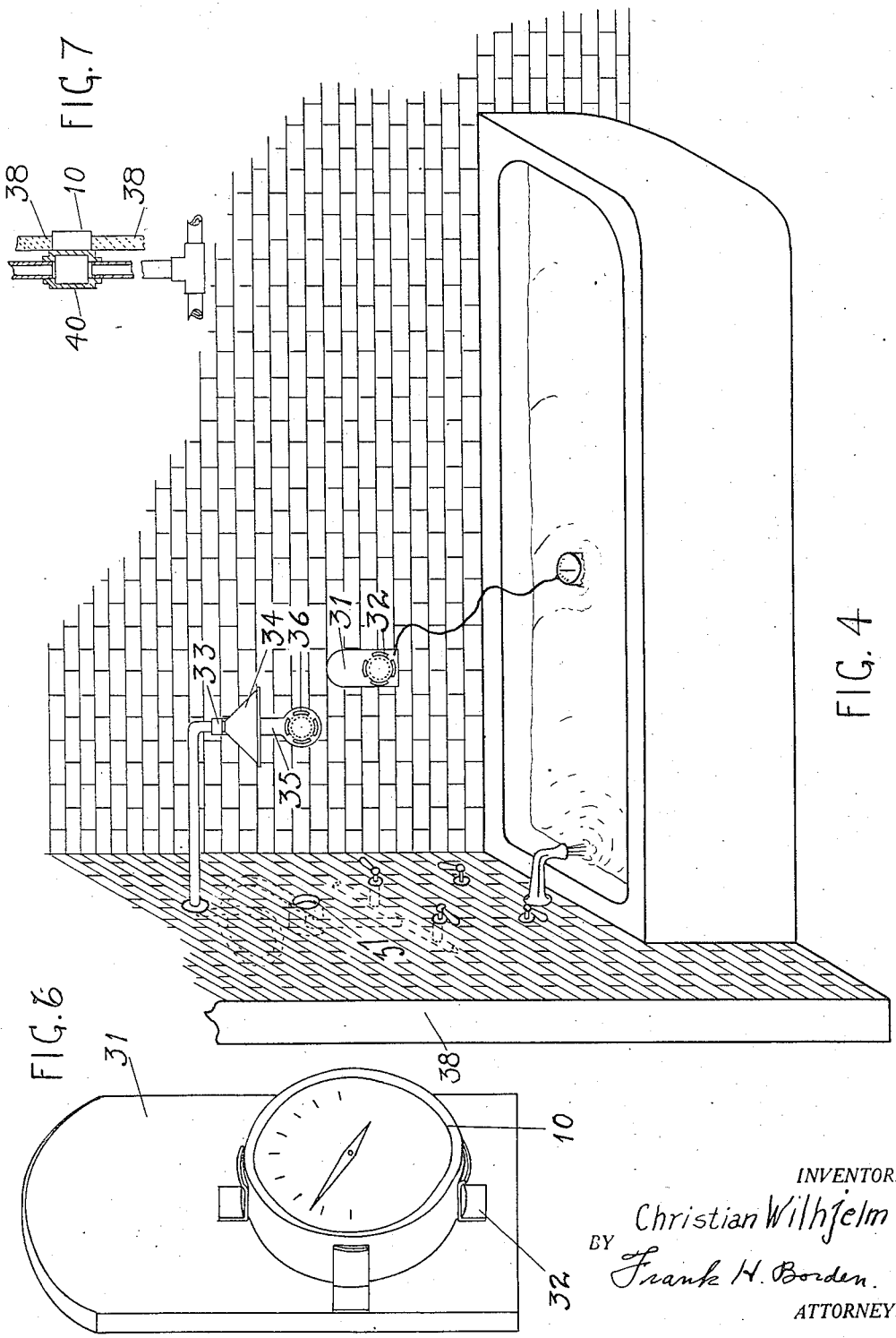
INVENTOR.
Christian Wilhjelm
BY Frank H. Borden.
                ATTORNEY.

Patented Mar. 24, 1936

2,034,852

UNITED STATES PATENT OFFICE 2,034,852

TEMPERATURE INDICATOR

Christian Wilhjelm, Philadelphia, Pa.

Application July 27, 1932, Serial No. 625,047

2 Claims. (Cl. 73—118)

This invention relates to temperature indicators and particularly to bath and bath room temperature indicators.

While some efforts have been made in the past to furnish devices for indicating temperatures of water for baths and the like, they have not been completely successful. Thus thermometers can be used to accurately tell the bath temperature although they tell no more than the degrees of heat. These require considerable manual dexterity to use and read, will not float, and are so brittle and fragile as to be of small value. While thermometers have been associated with floats of various sorts, the floats have in large measure interfered with prompt and accurate readings, the assembly is cumbersome, and in any case advises the operator merely of the degrees of heat of the water. Moreover such thermometers and thermometer assemblies have been arranged for partial or total immersion for their effect, and are not arranged to successfully indicate temperatures of shower baths and the like.

It is among the objects of this invention to improve generally the art of thermometers; to provide a buoyant thermometer; to provide in thermometers a two way indicator simultaneously indicating degrees and conditions characterized by the temperature without interference with quick and accurate reading of each; to provide a thermometer for bath purposes arranged to indicate temperatures of a shower bath; to provide a thermometer for bath room use which successively or electively indicates room temperature, bath temperature or shower bath temperature; and many other objects and advantages as will become more apparent as the description proceeds.

In the accompanying drawings:

Fig. 1 represents a perspective of the buoyant thermometer unit,

Fig. 2 represents a partially broken away perspective,

Fig. 3 represents a fragmentary side elevation of the attachment to a shower bath fitting, Fig. 4 represents a fragmentary perspective of a bath room with the several phases of the invention illustrated, Fig. 5 represents a transverse vertical section through the thermometer, Fig. 6 represents a fragmentary perspective of the assembly of thermometer and bracket, and Fig. 7 represents a fragmentary view of a shower mixing chamber and assembled thermometer.

It is desired to provide a structure which is inherently buoyant, and not dependent upon attached floats and the like. To this end, in the preferred form of the device, there is provided a thin walled metallic case or receptacle 10, having an annular rim 11, and the thin diaphragmatic bottom 12. The thinness of the bottom wall is of dual importance, in its quick and facile transmission of heat to the responsive mechanism or element within, to be described, and in its ready susceptibility to distortion axially of the annular rim 11 in response to differential external and internal air pressures. To this end it is desirable that the diameter of the case be appreciable to provide sufficient span to enable the proper diaphragmatic action, and also to insure that the air entrapped in the case be adequate to insure buoyance of the unit. The side walls may be provided with suitable grooves or other shoulders to support the dial to be described, but in its simplest form, as illustrated, a light weight spacing ring 13 is provided adjacent the side wall. Upon this ring is mounted a dial 14 having the central axial opening 15 having an eyelet 16 to form a guide for the shaft 17 rotatable but not slidable in the eyelet and having a lower end spaced from the thin bottom wall and is held against vertical movement in the eyelet by collar 18. An anchor 20 carries the bi-metallic element 21 formed in a helix about and anchored to the shaft 17. A glass window 22 is provided as a cover for the dial and as a closure for the case, and is provided with a rubber gasket or the like 23, resting upon a spacing ring 24 which engages the outer edge of the dial, and which is sealed in air tight relation by spinning over the upper edge of the side wall 11.

Prior to the attachment of the glass, a pointer 25 is mounted on the upper end of the shaft 17, which pointer has a long arm 26 terminating just inside of an arcuate strip of graduations in degrees, as at 27, and also carries a short arm 28, (preferably in diametrical relation to the long arm 26) and terminating inside of an arcuately aligned, radially disposed series of legends 30. It will be observed that the pointer simultaneously points to the degrees of temperature and also to the legend relative to the characteristics of that temperature, and that in every case the pointer terminates so as not to overlie that which is to be read. It is to be observed further that there is adequate space for both legends and calibrations, such as might not be secured if both were disposed in the same area. Obviously the dial may be made of any desired material, such as paper or cardboard, upon which the data may be printed, but it is preferred that light sheet metal be used.

In the preferred use of the thermometer described, there may be provided a wall plate 31, having radially spaced prongs 32 toward the bottom to frictionally embrace and hold the thermometer, and so arranged that the glass 22 is substantially vertical, and so arranged that the observer entering the room containing the device may see at a glance the temperature of the room. The upper part of the plate may be provided with explanatory matter as to use of the invention, or a further exposition of desirable temperatures for various purposes.

It is convenient to provide a bracket 33, clamped to the neck or other part of a shower bath head 34, with the plate 35 extending in such angular relation thereto as to have the prongs 36 and the thermometer casing mountable therein in the path of some portion of the spray from said head. This enables the operator to stand outside of the shower while manipulating the controls and watch the thermometer for the desired temperature without actually submitting his person to the variations in temperature so customary in practice heretofore in efforts to secure the right temperature by mixture of hot and cold water.

The invention lends itself for use with a recess 37 in the wall 38 of the shower or other room, the inner wall of which recess either is formed directly of a mixing chamber 40 of the shower bath system, or is in thermal contact therewith. The recess is of such size as to receive the thermometer of this invention, and the assembly enables the determination of the shower temperature without contact with the water itself.

It is contemplated that the thermometer unit may be attached by a suitable cable or chain to the plate 31, in public or quasi-public bathrooms, as in hotels and the like, of a length such as to permit all of its function, while restricting its movement to the proximity of the bath. For use in homes and private bathrooms, the thermometer unit will preferably be completely detachable from the backing plate, and the cable will be obviated.

The thermometer will of course be used as desired but normally will be disposed on the wall bracket in position to be observed by the user upon entering the room to determine whether the room temperature is proper for the bath. This being determined the water may be started in the tub and the thermometer removed from the bracket and dropped in the water with the face or dial uppermost. It floats upon the water as the level rises, constantly responsive to variations in temperature and indicating whether cold or hot is to be added. The hands of the operator are left free and dry during this operation to facilitate preparations for the bath. The thermometer may remain in the bath until its conclusion, but preferably is removed and replaced on the bracket after the desired temperature is attained.

For shower bath purposes, the user may place the thermometer in the prongs 36 of the shower bracket, then start the shower. The temperature of the mixture of cold and the proper temperature can thus be quickly and easily obtained without either practical or total immersion of the user in the shower. If desired the recess 37 of the wall or other portion of the room may be utilized as a point of location of the thermometer, as described, and the assembly of the recess and thermometer may be either temporary or permanent. Thus it is contemplated that a thermometer unit according to this invention may be built in to thermal contact with the water supply, as a permanent feature of the room.

The manifold advantages of the invention are thought to be clear.

I claim:

1. A thermometer comprising a case having a relatively thin bottom wall, a glass closure for the case in air tight relation thereto sealing entrapped air within said case, a thermally responsive element in the case, said thin wall being substantially free of the thermally responsive element and being so proportioned as to flex in response to variations in pressure in the case due to temperature variations of said entrapped air to preclude violent fluctuations of pressure within the case.

2. A buoyant bath thermometer comprising a case having a thin predeterminedly flexible diaphragmatic wall arranged to flex in response to variations in pressure within the case responsive to variations in temperatures incident on the wall to reduce the effect of such variations in temperatures, a glass closure for the case, means sealing the glass in the case so that the seal resists rupture at maximum variations of pressure in the case at which the wall would flex incident to normal bath temperatures, a thermally responsive means and a pointer actuated thereby within the case and operative to indicate temperatures incident on the thin wall during its flexing, the case and glass sealed with entrapped air in the case.

CHRISTIAN WILHJELM.